United States Patent [19]
Nitta et al.

[11] Patent Number: 5,779,770
[45] Date of Patent: Jul. 14, 1998

[54] MAGNETIC FIELD TYPE OXYGEN ENRICHED AIR PRODUCING APPARATUS

[75] Inventors: Shoichiro Nitta, Aichi-ken; Takashi Izuo, Toyota; Kazuhisa Mikame, Nagoya; Shinzo Kobuki, Toyota; Yozo Ito, Okazaki; Kazuhiro Asayama, Nisshin, all of Japan

[73] Assignee: Toyota Jidosha Kabushiki Kaisha, Toyota, Japan

[21] Appl. No.: 746,490

[22] Filed: Nov. 12, 1996

[30] Foreign Application Priority Data

Nov. 13, 1995 [JP] Japan ................................ 7-294597
Oct. 4, 1996 [JP] Japan ................................ 8-263926

[51] Int. Cl.$^6$ ........................................... B03C 1/02
[52] U.S. Cl. ........................................... 96/2; 95/28
[58] Field of Search .................. 96/1, 2, 3; 95/28

[56] References Cited

U.S. PATENT DOCUMENTS

| | | | |
|---|---|---|---|
| 3,177,633 | 4/1965 | McDonald, Jr. .......................... | 96/1 |
| 3,277,631 | 10/1966 | Sunnen .......................... | 96/1 X |
| 4,156,832 | 5/1979 | Kistemaker et al. .......................... | 96/1 X |
| 4,217,213 | 8/1980 | Schuster .......................... | 96/1 X |
| 4,704,139 | 11/1987 | Yamamoto et al. .......................... | 95/28 |

FOREIGN PATENT DOCUMENTS

| | | | |
|---|---|---|---|
| 3630913 | 3/1988 | Germany .......................... | 96/1 |
| 54-049993 | 4/1979 | Japan . | |
| 54-47890 | 4/1979 | Japan .......................... | 96/2 |
| 58-112022 | 7/1983 | Japan .......................... | 96/1 |
| 1-135548 | 5/1989 | Japan .......................... | 96/1 |
| 2-045503 | 10/1990 | Japan . | |

OTHER PUBLICATIONS

Collection Of Technical Materials–Technique of gas separation and industrial utilization of membrane–"Comparative of each oxygen enriched air producing method", pp. 151–154, and An introduction to oxygen–enrichment and industrial utilization thereof, pp. 168–179, Undated.

WULI, vol. 15, No. 1 (1986): "The difference in the magnetic characteristics between oxygen and nitrogen and its application", pp. 48–51.

Journal Of Membrane Science, 87 (1994), "Application of membrane gas separation to oxygen enrichment of diesel engines", pp. 159–169.

*Primary Examiner*—Richard L. Chiesa
*Attorney, Agent, or Firm*—Cushman Darby & Cushman IP Group of Pillsbury Madison & Sutro LLP

[57] ABSTRACT

An oxygen enriched air producing apparatus includes a casing, at least one rotor rotatably disposed in the casing to thereby define a space between the casing and the rotor, and a magnetic field generating device for generating a magnetic flux extending axially within the space between the casing and the rotor. An oxygen enriched air outlet and a nitrogen enriched air outlet are formed in the casing so as to be spaced from each other in an axial direction of the space.

12 Claims, 8 Drawing Sheets

F I G. 1
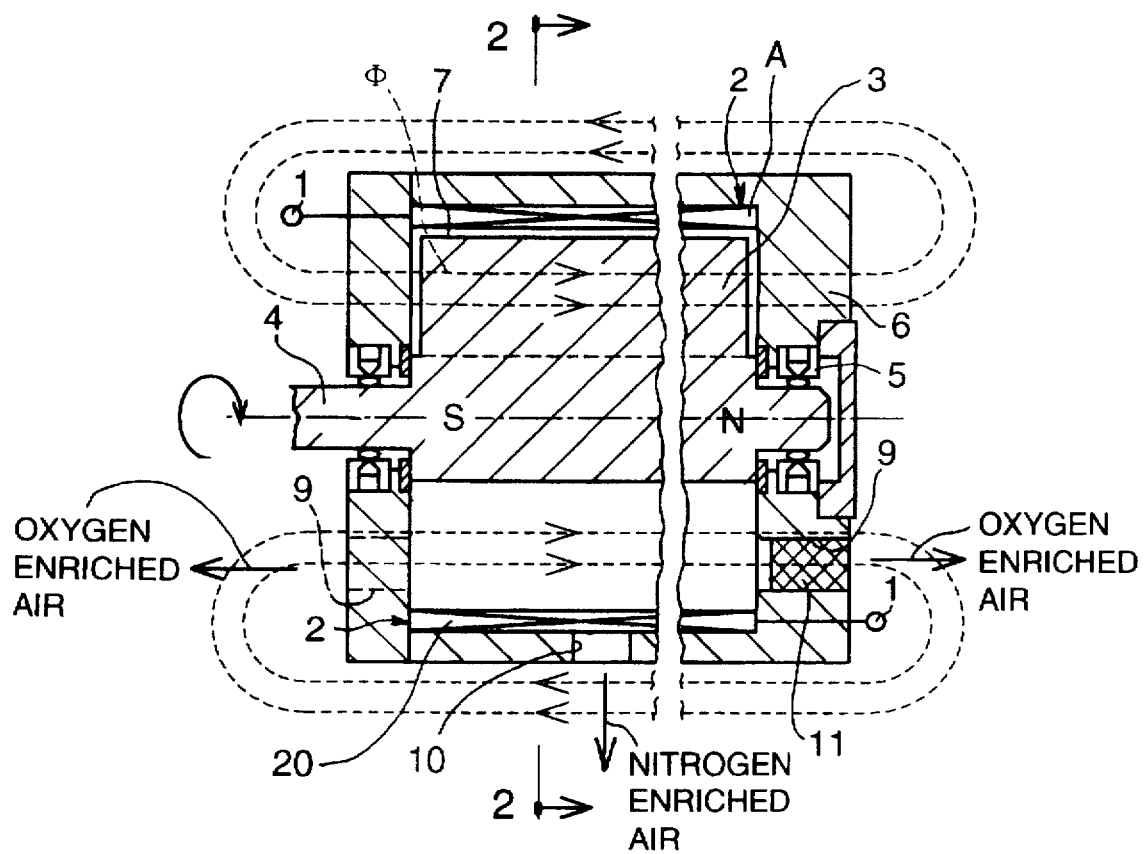
F I G. 2
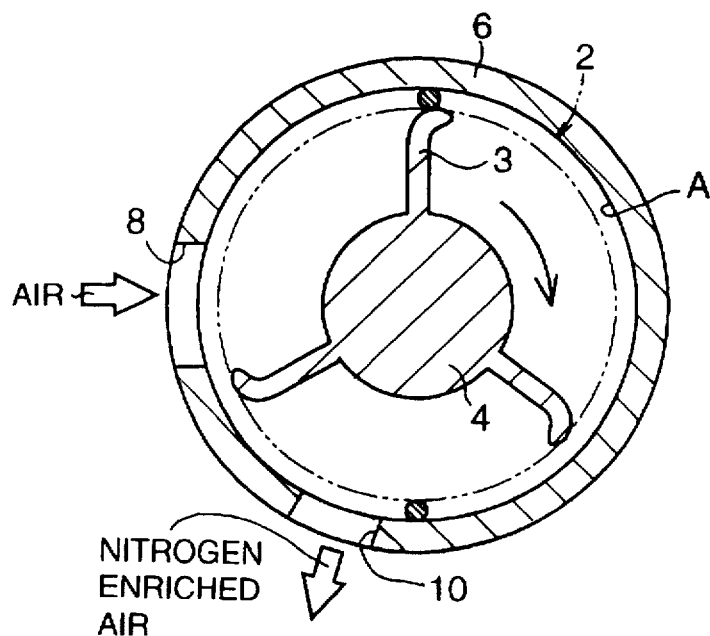

o NON-SUPERCHARGING AND NON-OXYGEN ENRICHING
• SUPERCHARGING AND OXYGEN ENRICHING

– 5,779,770 –

MAGNETIC FIELD TYPE OXYGEN ENRICHED AIR PRODUCING APPARATUS

This application is based on Japanese Patent Applications HEI 7-294597 filed on Nov. 13, 1995 and HEI 8-263926 filed on Oct. 4, 1996, the content of which is incorporated into the present application by reference.

BACKGROUND OF THE INVENTION

1. Field of the Invention

The present invention relates to an apparatus for producing oxygen enriched air by utilizing a magnetic field.

2. Description of Related Art

It is known as a principle that oxygen enriched air can be produced from air by utilizing a difference in a magnetic susceptibility between oxygen and nitrogen. In this connection, oxygen is paramagnetic and has a magnetic susceptibility of about $+106.2 \times 10^{-6}$ emu/g, and nitrogen is diamagnetic and a magnetic susceptibility of about $-0.43 \times 10^{-6}$ emu/g.

In order to utilize an oxygen enriched air producing apparatus for vehicles, combustion apparatuses, and other industrial apparatuses, it is desirable that a yield of oxygen be large, that an amount of oxygen be large, and that a continuous supply of oxygen be possible. From this aspect, a rotary type apparatus is superior to a piston type and a batch type apparatus.

Japanese Patent Publication No. SHO 54-49993 discloses an oxygen and nitrogen separation apparatus where a rotor is rotatably disposed in a cylindrical casing. The rotor and the casing define a space therebetween where a magnetic field with a magnetic flux extending radially in the space is generated. When air is continuously supplied to the space, oxygen which has a high magnetic susceptibility is polarized to be separated from the air so that oxygen enriched air is taken out through an oxygen enriched air outlet and remaining nitrogen enriched air is taken out through a nitrogen enriched air outlet.

However, because the generated magnetic flux extends in the radial direction of the space in the above-described apparatus, to increase the yield of oxygen, the radial distance between the rotor and the casing has to be large. As a result, the apparatus will be enlarged in a radial direction thereof.

SUMMARY OF THE INVENTION

An object of the present invention is to provide a magnetic field type oxygen enriched air producing apparatus of a rotary type which is compact in size, particularly in a radial direction of the apparatus.

A magnetic field type oxygen enriched air producing apparatus according to the present invention for achieving the above-described object includes a casing, a rotor, and a magnetic field generating device. The rotor is disposed in and rotatably supported by the casing. The rotor and the casing define a space therebetween which has an axis and extends in an axial direction of the space. The magnetic field generating device is a device for generating a magnetic field in the space. The magnetic field includes a magnetic flux axially extending through the space and magnetic poles produced at opposite ends of the space. An air inlet is formed in the casing. An oxygen enriched air outlet is formed in the casing at a position close to at least one of the magnetic poles, and a nitrogen enriched air outlet is formed in the casing at a position away from the oxygen enriched air outlet.

In the apparatus according to the present invention, because the generated magnetic flux extends in the axial direction in the space, a gradient of enriched oxygen concentration is formed in the axial direction of the space. As a result, it is not necessary to provide a large size of distance between the rotor and the casing unlike the conventional apparatus, so that the size of the apparatus of the present invention can be compact, particularly in the radial direction of the apparatus. In the apparatus, an oxygen molecule in the air flowing into the space is polarized. In contrast, a nitrogen molecule in the flowing air is generally not polarized and, even if polarized, is polarized to a polarity opposite to that of the oxygen molecule. Therefore, the nitrogen molecule is repulsed by the poles to move away from the poles. As a result, the oxygen enriched air can be selectively taken out through the oxygen enriched air outlet positioned closely to the poles, and the nitrogen enriched air can be selectively taken out through the nitrogen enriched air outlet positioned away from the poles.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 1 is a cross-sectional view of a magnetic field type oxygen enriched air producing apparatus according to a first embodiment of the present invention;

FIG. 2 is a cross-sectional view of the apparatus of FIG. 1 taken along line 2—2;

DETAILED DESCRIPTION OF THE PREFERRED EMBODIMENTS

Figure 3:
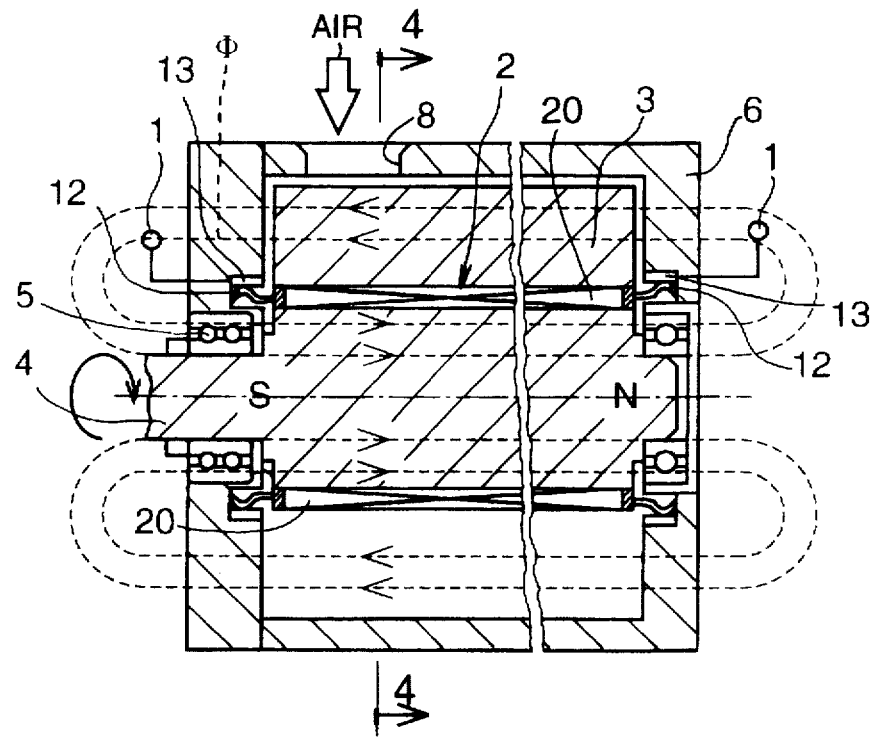
FIG. 3 is a cross-sectional view of a magnetic field type oxygen enriched air producing apparatus according to a second embodiment of the present invention.
Figure 4:
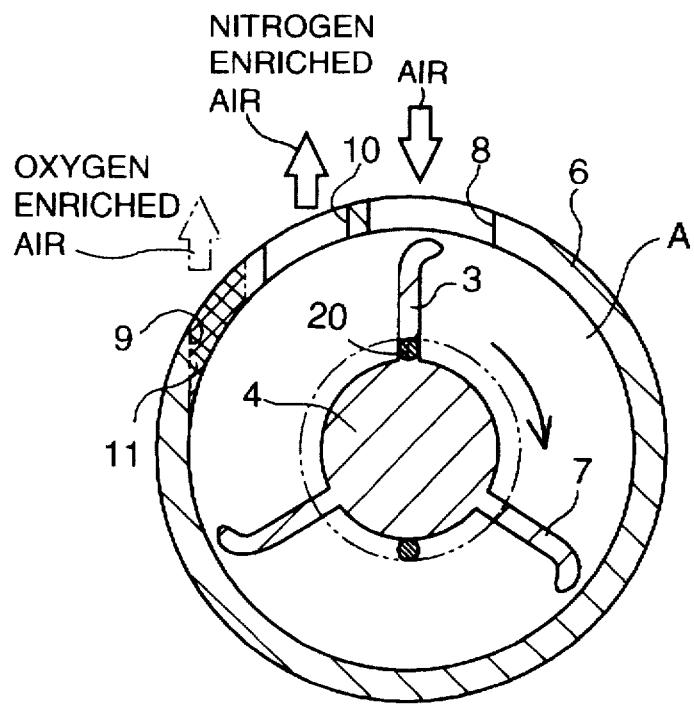
FIG. 4 is a cross-sectional view of the apparatus of FIG. 3 taken along line 4—4.
Figure 5:
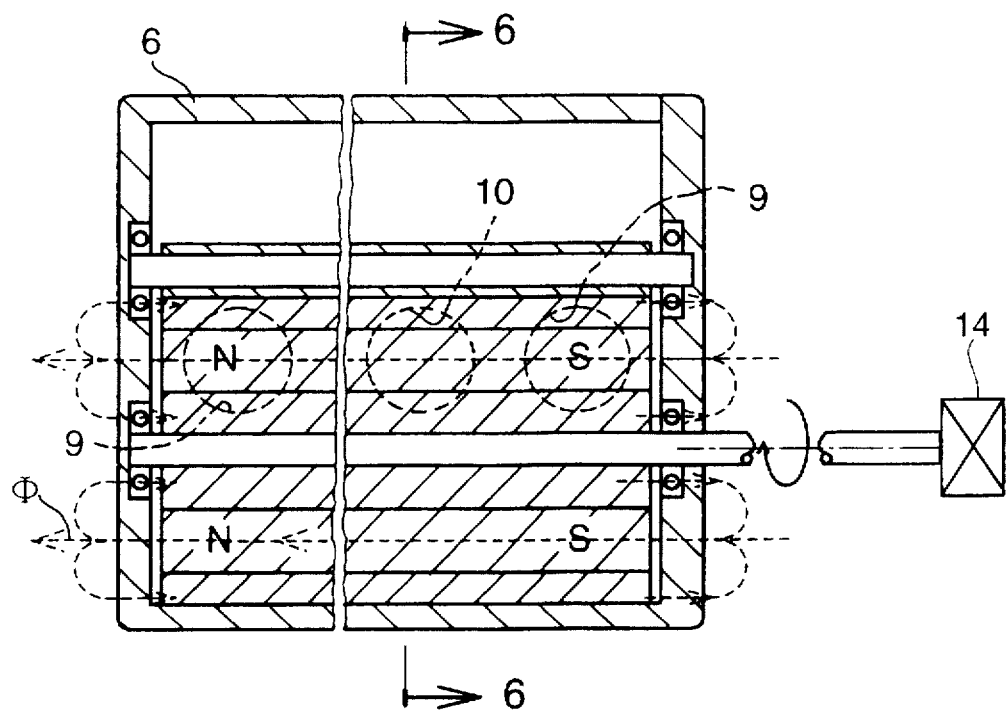
FIG. 5 is a cross-sectional view of a magnetic field type oxygen enriched air producing apparatus according to a third embodiment of the present invention.
Figure 6:
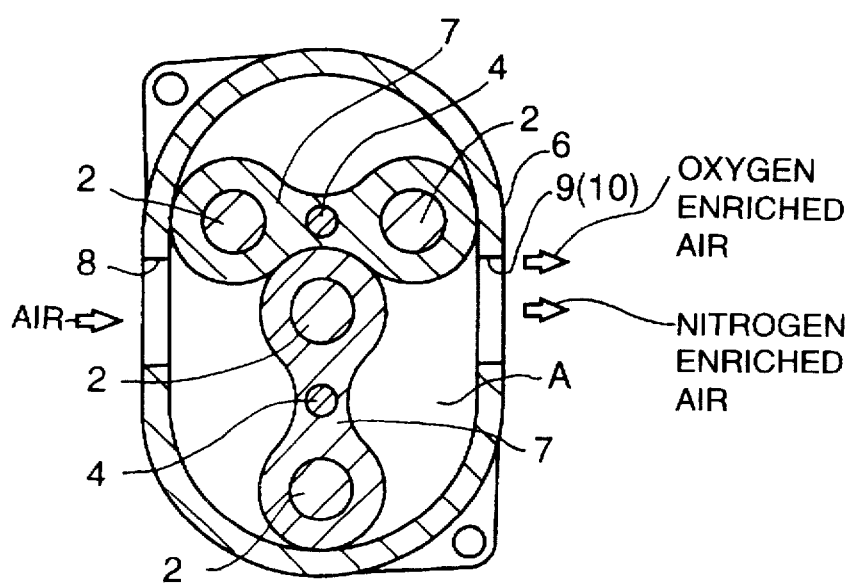
FIG. 6 is a cross-sectional view of the apparatus of FIG. 5 taken along line 6—6.
Figure 7:
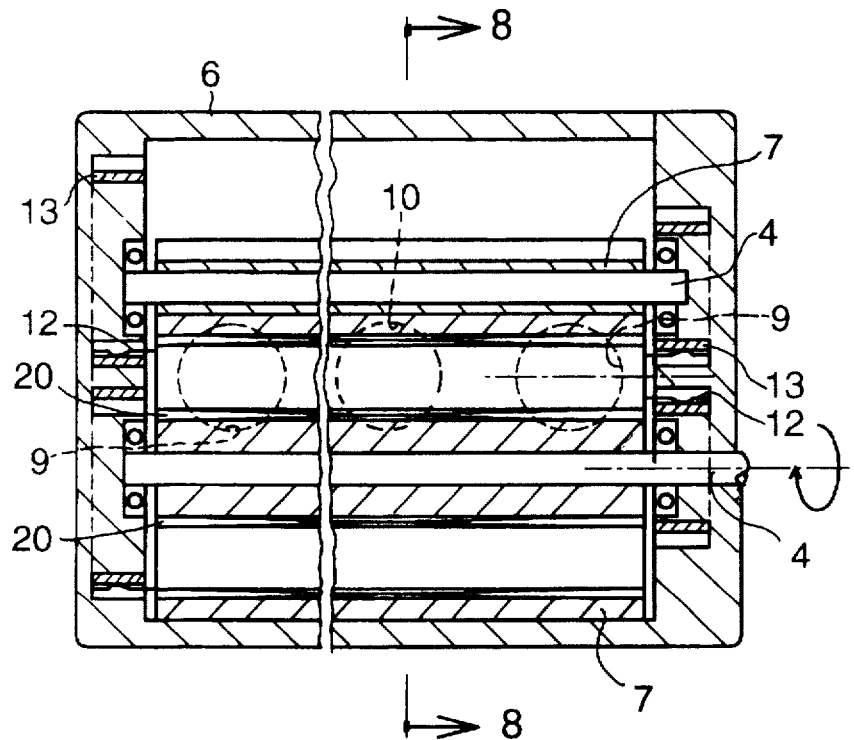
FIG. 7 is a cross-sectional view of a magnetic field type oxygen enriched air producing apparatus according to a fourth embodiment of the present invention.
Figure 8:
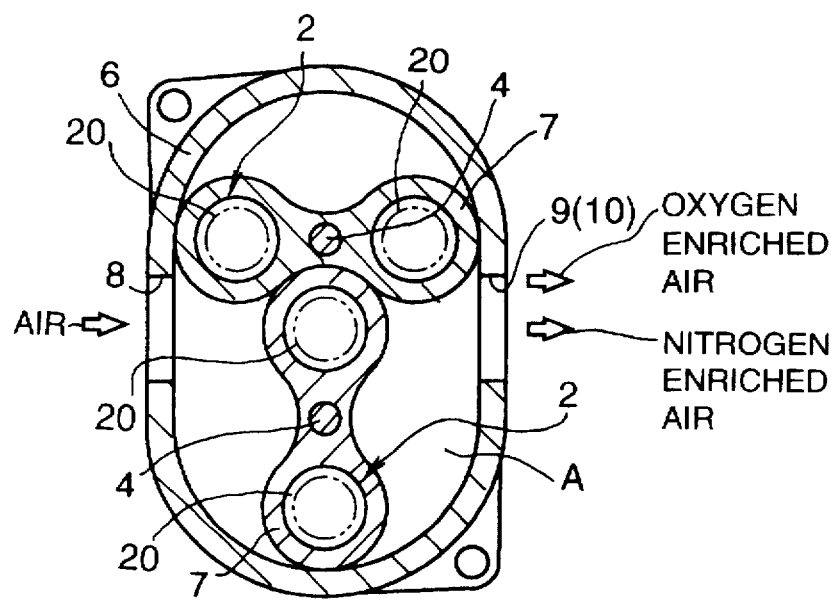
FIG. 8 is a cross-sectional view of the apparatus of FIG. 7 taken along line 8—8.
Figure 9:
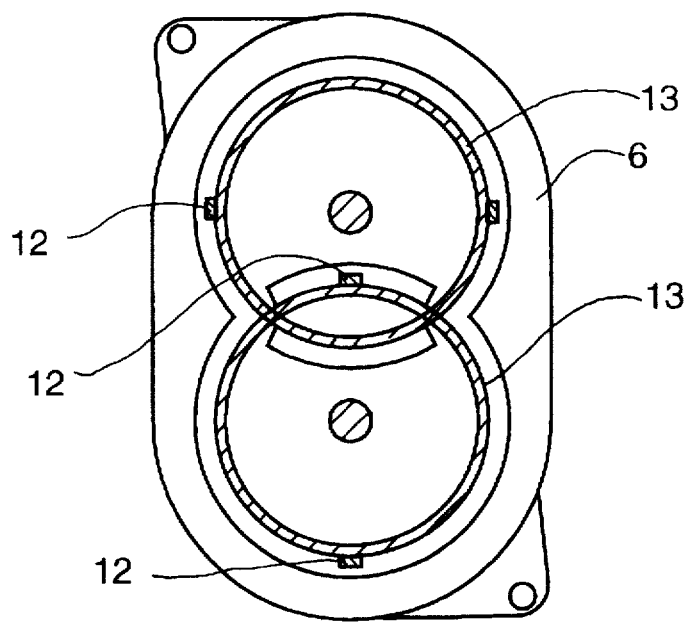
FIG. 9 is an elevational view partially in section of an end plate at one axial end of a casing of the apparatus of FIG. 7.
Figure 10:
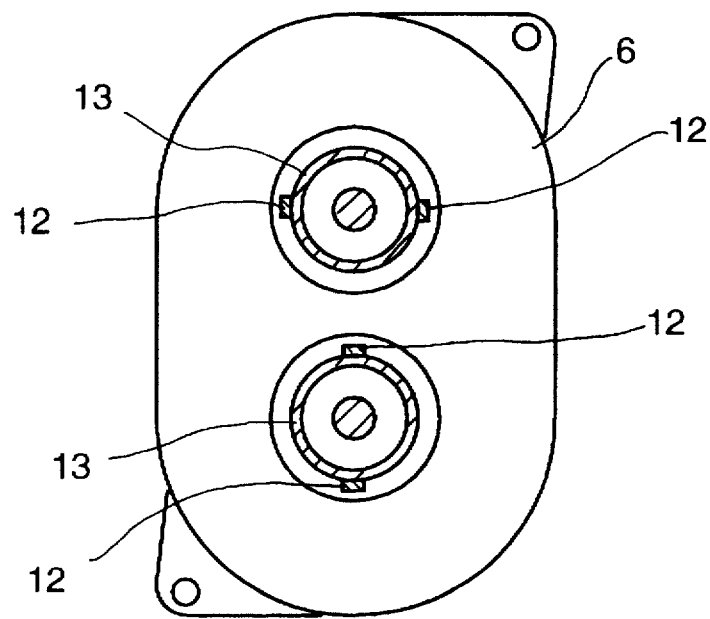
FIG. 10 is an elevational view partially in section of an end plate at another axial end of the casing of the apparatus of FIG. 7.
Figure 11:
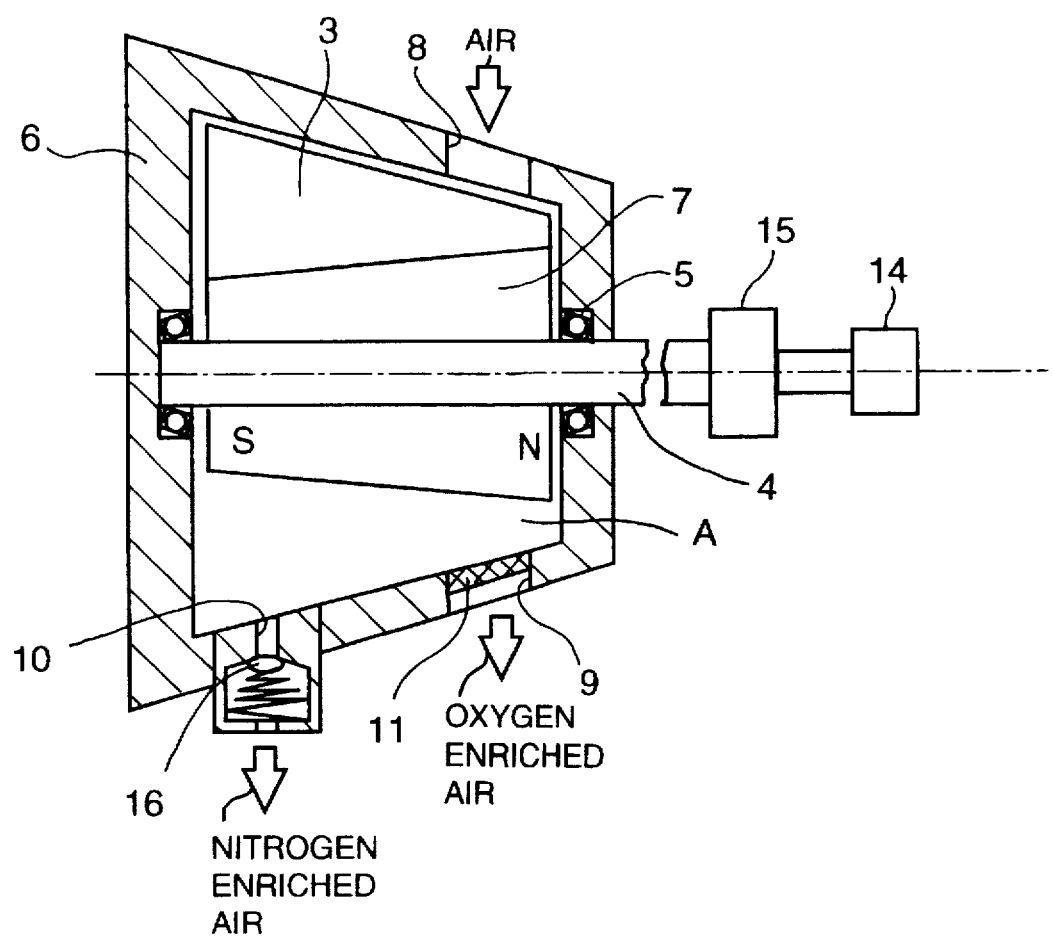
FIG. 11 is a cross-sectional view of a magnetic field type oxygen enriched air producing apparatus according to a fifth embodiment of the present invention.
Figure 12:
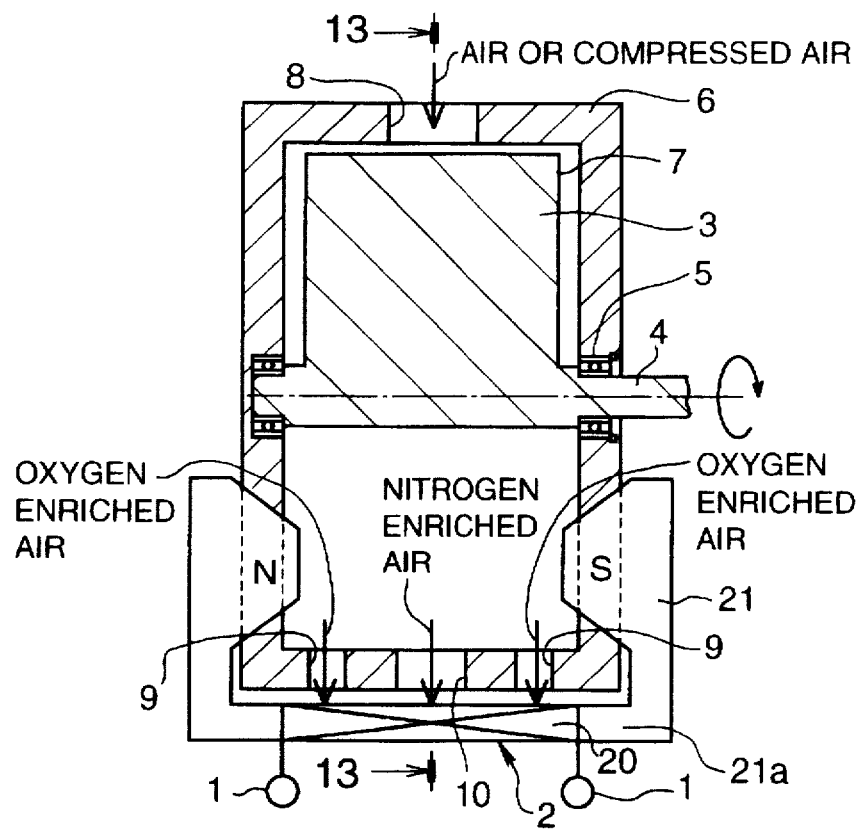
FIG. 12 is a cross-sectional view of a magnetic field type oxygen enriched air producing apparatus according to a sixth embodiment of the present invention.
Figure 13:
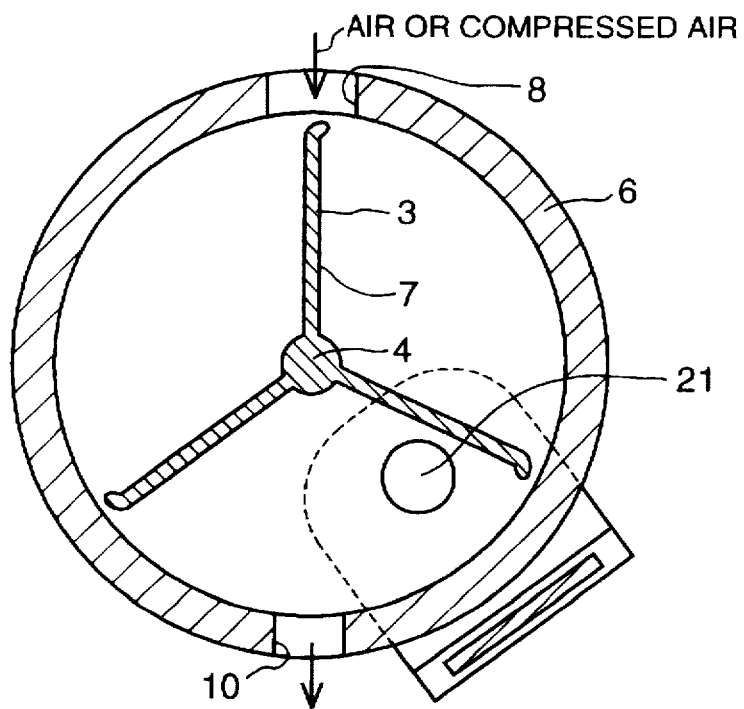
FIG. 13 is a cross-sectional view of the apparatus of FIG. 12 taken along line 13—13.
Figure 14:
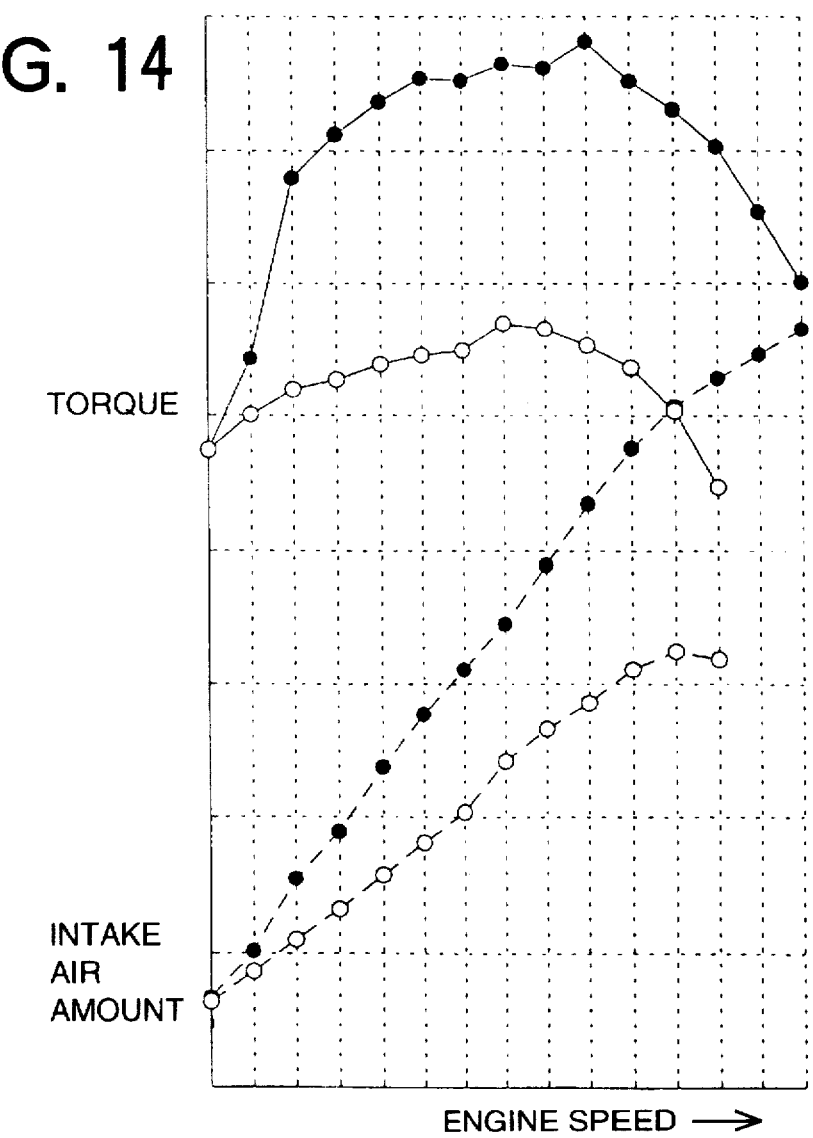
FIG. 14 is a graph illustrating a torque characteristic in a case where the apparatus according to the present invention is applied to an intake system of an internal combustion engine.
Figure 15:
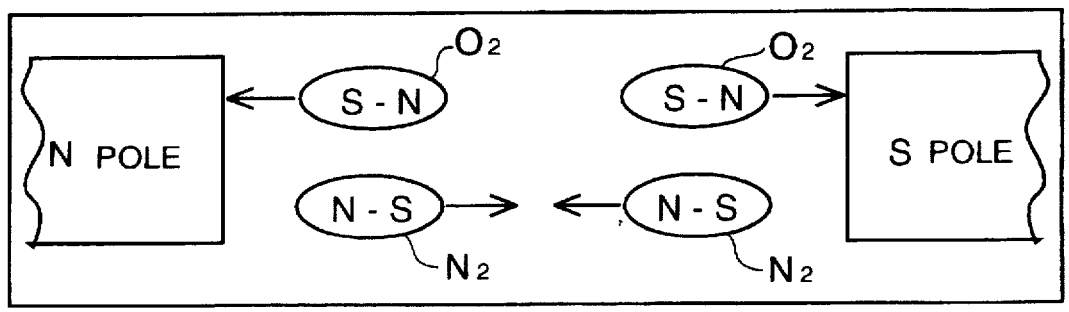
FIG. 15 is a schematic diagram illustrating magnetic polarization of an oxygen molecule and a nitrogen molecule in the apparatus according to the present invention.

FIGS. 1 and 2 illustrate a first embodiment of the present invention. FIGS. 3 and 4 illustrate a second embodiment of the present invention. FIGS. 5 and 6 illustrate a third embodiment of the present invention. FIGS. 7 to 10 illustrate a fourth embodiment of the present invention. FIG. 11 illustrates a fifth embodiment of the present invention, and FIGS. 12 and 13 illustrate a sixth embodiment of the present invention. FIGS. 14 and 15 are virtually applicable to any embodiment of the present invention. Portions common or similar to all of the embodiments of the present invention are denoted with the same reference numerals throughout all of the embodiments of the present invention.

First, structural portions and operation thereof common or similar to any of the embodiments of the present invention will be explained with reference to, for example, FIGS. 1 and 2, and 14 and 15.

As illustrated in FIGS. 1 and 2, a magnetic field type oxygen enriched air producing apparatus according to any embodiment of the present invention includes a casing 6 made from nonmagnetic material and a rotor 7 made from nonmagnetic material and rotatably supported in the casing 6. The rotor 7 includes a shaft 4 and a plurality of blades 3. The rotor 7 and the casing 6 define a space A therebetween. The space has an axis and extends an axial direction. The oxygen enriched air producing apparatus further includes a magnetic field generating device generally indicated at 2 for generating a magnetic field which includes a magnetic flux Φ axially extending within the space A and magnetic poles S and N produced at opposite ends of the space A. The magnetic flux generating device 2 extends in the axial direction of the space and includes an electromagnet including a coil 20 and a D.C. power source, or a permanent magnet. The oxygen enriched air producing apparatus further includes an air inlet 8 formed in the casing 6, an oxygen enriched air outlet 9 formed in the casing 6 at a portion close to at least one of the generated N and S poles at axial end portions of the casing 6, and a nitrogen enriched air outlet 10 formed in the casing at a portion axially spaced from and between the generated N and S poles. The shaft 4 is driven by a drive device (for example, a motor, not shown). The shaft 4 is rotatably supported by the casing 6 via a bearing 5 (for example, a magnetic fluid bearing). The blade 3 rotates with the shaft 4 and operates as a blower. In a case where the magnetic field generating device 2 includes a coil, the coil 20 receives a D.C. electric current through terminals 1 from the D.C. electric power source. A polymeric oxygen separating membranes 11 for selectively causing oxygen to pass therethrough may be provided at the oxygen enriched air outlet 9.

Operation of the above-described common structures will be explained.

The rotor 7 is driven by the drive device thereby compressing air which has been introduced into the space A and discharging the compressed air through the air outlets 9 and 10. In this instance, the magnetic field generating device 2 which includes, for example, a coil wound in a clockwise direction around an axis extending from a left side to a right side in FIG. 1 generates a magnetic field with a magnetic flux extending axially in the space A defined between the casing 6 and the rotor 7.

As illustrated in FIG. 15, when oxygen which is paramagnetic is magnetized in the magnetic field, in the vicinity of an N (north) pole, the oxygen molecule is polarized in the form of S-N so as to be magnetically attracted to the N pole, and in the vicinity of an S (south pole, the oxygen molecule is polarized in the form of N-S so as to be magnetically attracted to the S pole. When nitrogen which is diamagnetic is magnetized in the magnetic field, in the vicinity of the N pole, the nitrogen molecule is polarized in the form of N-S so as to be repulsed by the N pole, and in the vicinity of the S pole, the nitrogen molecule is polarized in the form of S-N so as to be repulsed by the S pole.

As a result, since the oxygen has a large magnetic susceptibility, oxygen molecules contained in the air introduced into the space between the casing 6 and the rotor 7 are magnetized and move toward the N or S pole. Therefore, a portion of the space close to the poles are enriched with oxygen. Since the nitrogen has a small magnetic susceptibility, nitrogen molecules contained in the air introduced into the space A between the casing 6 and the rotor 7 are generally not magnetized. Even if the nitrogen molecules are magnetized, they are magnetized to a polarity opposite to that of the oxygen molecules, and therefore are expelled away from the N and S poles, that is, toward an axial central portion of the space A.

As a result, oxygen enriched air is selectively discharged through the oxygen enriched air outlets 9 which are formed in the axial ends of the casing 6 at positions close to the N and/or S poles, and remaining nitrogen enriched air is selectively discharged through the nitrogen enriched air outlet 10 which is formed in the axial central portion of the casing 6 at positions away from the N and/or S poles.

Owing to the oxygen enriching operation by the magnetic field and the supercharging operation by the blade, an engine torque is improved compared with a case of non-enriching and non-charged intake, as shown in FIG. 14. Further, since the apparatus is of a rotary type, a continuous supply of air is possible and an amount of air supplied to the apparatus is also large. Furthermore, since the generated magnetic flux extends in the axial direction of the space A, it is not necessary to provide a large distance between the casing 6 and the rotor 7 in the radial direction thereof. As a result, the size of the apparatus is compact in the radial direction of the apparatus. Furthermore, since the oxygen enriched air and the nitrogen enriched air are distanced from each in the axial direction of the space, selectively removing the oxygen enriched air through the oxygen enriched air outlet at the axial end of the casing can be conducted efficiently, so that the yield of oxygen is improved.

Structural portions and operation thereof unique to each embodiment of the present invention will now be explained.

With the first embodiment of the present invention, as illustrated in FIGS. 1 and 2, the casing 6 has a hollow cylindrical portion and end plates at opposite ends of the cylindrical portion, and the rotor 7 includes a blower having a single shaft 4 and a plurality of blades 3. The bearing 5 is constructed of, for example, a magnetic fluid bearing. The magnetic field generating device 2 includes a coil providing a D.C. current. The coil 20 is disposed along an inside surface of the cylindrical portion of the casing 6. The oxygen enriched air outlet 9 is formed in the end plates (the N and S poles) of the casing 6 and the nitrogen enriched air outlet 10 is formed in the axial central portion (a mid portion between the N and S poles) of the cylindrical portion of the casing 6.

With respect to operation of the apparatus according to the first embodiment of the present invention, because the coil 20 is disposed at the casing and therefore does not rotate, it is not necessary to provide a current collecting equipment for supplying electric current to the coil 20. As a result, the electric current supplying mechanism is simple and reliable.

With a second embodiment of the present invention, as illustrated in FIGS. 3 and 4, the casing 6 has a hollow cylindrical portion and end plates at opposite ends of the cylindrical portion, and the rotor 7 includes a blower having a single shaft 4 and a plurality of blades 3. The bearing 5 is constructed of, for example, a radial ball bearing. The magnetic field generating device 2 includes a coil for D.C. current. The coil 20 is disposed along an outside surface of the shaft 4 of the rotor 7. An electric current is supplied through a slip ring 13 and a brush 12 which constructs electric current collecting equipment. The oxygen enriched air outlet 9 is formed in the axial end portions (the N and S poles) of the cylindrical portion of the casing 6, and the nitrogen enriched air outlet 10 is formed in the axial central portion (a mid portion between the N and S poles) of the cylindrical portion of the casing 6.

With an advantage of the apparatus according to the second embodiment of the present invention, because the cylindrical portion of the casing 6 is not occupied by the coil 20, it is possible to provide the air inlet 8 and the air outlets 9 and 10 in the cylindrical portion of the casing 6. As a result, the freedom of design is great.

With a third embodiment of the present invention, as illustrated in FIGS. 5 and 6, the casing 6 has a wall having an elliptical cross-section and end plates, and two rotors 7, each having a gourd-shaped cross-section and an axis of rotation, are housed in the casing 6 so as to be rotatable about the respective axis of rotation. The rotors 7 are driven by a drive device 14 coupled to a shaft 4 of either one of the rotors 7. The magnetic field generating device 2 which is an axially extending permanent magnet is embedded in each rotor 7, and the N poles of the respective magnets are directed toward the same direction. The air inlet 8 is formed in one side of the wall of an elliptical configuration of the casing 6 and the oxygen enriched air outlet 9 and the nitrogen enriched air outlet 10 are formed in the other side of the wall of an elliptical configuration of the casing 6.

Due to the above-described structure, the apparatus operates as a Root's blower supercharger. A magnetic field with an axially extending magnet flux is generated in the space A defined between the rotor 7 and the casing 6 by the magnetic field generating device 2. Oxygen enriched air flows out selectively through the oxygen enriched air outlet 9 disposed close to the N pole and/or the S pole. By mounting this apparatus to an intake system of an internal combustion engine of a vehicle, both an intake air supercharging operation and an oxygen air enriching operation are obtained, so that, as illustrated in FIG. 14, the torque characteristic of the engine is greatly improved compared with a case of non-supercharging and non-oxygen enriching. Further, since a permanent magnet is used for the magnetic field generating device 2, it is not necessary to supply electricity for generating the magnetic field.

With a fourth embodiment of the present invention, as illustrated in FIGS. 7 to 10, the casing 6 has a wall having an elliptical cross-section and end plates, and two rotors 7 each having a gourd-shaped cross section and an axis of rotation are housed in the casing 6 so as to be rotatable about the respective axis of rotation. The rotors 7 are driven by a drive device (not shown) coupled to a shaft 4 of either one of the rotors 7. Each rotor 7 has opposite portions each having an enlarged cross-sectional area where a cylindrical hole is formed, and the magnetic field generating device 2 having a coil 20 is disposed along a surface of the hole. The N poles of the respective coils are directed toward the same direction. The air inlet 8 is formed in one side of the wall of an elliptical configuration of the casing 6 and the oxygen enriched air outlet 9 and the nitrogen enriched air outlet 10 are formed in the other side of the wall of an elliptical configuration of the casing 6.

Electricity supply to the coil 20 is conducted by an electric current collecting equipment including a brush 12 and a slip ring 13. As illustrated in FIGS. 9 and 10, the slip ring 13 is disposed in a groove formed in the end plates of the casing 6. The D.C. current is applied from a slip ring 13 disposed at one end plate via the brush 12 to the coil 20 and from the coil 20 to a slip ring 13 disposed at the other end plate.

Due to the above-described structure, the apparatus is operable as a Root's blower supercharger. A magnetic field with an axially extending magnet flux is generated in the space defined between the rotor 7 and the casing 6 by the magnetic field generating device 2. Oxygen enriched air flows out selectively through the oxygen enriched air outlet 9 disposed close to the N pole and/or the S pole. By mounting this apparatus to an intake system of an internal combustion engine for a vehicle, both an intake air charging operation and an oxygen air enriching operation are obtained, so that, as illustrated in FIG. 14, the torque characteristic of the engine is greatly improved compared with a case of non-supercharging and non-oxygen enriching. Further, since a coil is used for generating the magnetic field, it is easy to change the intensity of the magnetic field and the yield of oxygen by changing the magnitude of the electric current.

The above-described supercharger structure having two rotors 7 with a gourd-shaped cross-section may be replaced by any other structure listed below.

(1) A gear pump including a casing having a wall of an elliptical configuration and two rotors each having a gear-shaped cross section and housed in the casing.

(2) A Lysholm compressor having a casing and two rotors of a rotary screw.

(3) A screw type pump having a casing and two rotors of a screw.

(4) A movable vane compressor having a casing and a rotor to which vanes are slidably mounted.

With a fifth embodiment of the present invention, as illustrated in FIG. 11, the space A between the casing 6 and the rotor 7 includes a first volume on a side of the oxygen enriched air outlet 9 and a second volume greater than the first volume on a side of the nitrogen enriched air outlet 10. The rotor 7 is permanently magnetized. The first volume has a radial distance between the rotor 7 and the casing 6 smaller than a radial distance of the second volume. More particularly, a radius of the casing 6 is gradually increased from the side of the oxygen enriched air outlet 9 to the side of the nitrogen enriched air outlet 10. A speed increasing device 15 (for example, a plurality of gears, a chain, or a belt) is provided on a torque transmitting member between the shaft 4 and the drive device 14. A pressure control valve 16 may be disposed at the nitrogen enriched air outlet 10.

Because oxygen and nitrogen are contained by 21% and 78% (volume) respectively in air and so nitrogen exists about four times oxygen, when oxygen and nitrogen are separated in the magnet field, it is difficult for a portion of the space close to the oxygen enriched air outlet 9 to be occupied by the oxygen enriched air only. However, in the fifth embodiment of the present invention, because the volume around the oxygen enriched air outlet 9 is small, it is easier for the portion of the space close to the oxygen enriched air outlet 9 to be occupied by the oxygen enriched air only. As a result, the yield of oxygen is increased.

Though the apparatus of FIG. 11 includes a single rotor 7, the same structure as described above can be taken in a case of an apparatus having a plurality of rotors.

With a sixth embodiment of the present invention, as illustrated in FIGS. 12 and 13, the casing has a wall having a cylindrical configuration and end plates. The rotor 7 includes a shaft 4 and a plurality of blades 3. The bearing 5 includes a radial ball bearing. The magnetic field generating device 2 includes a magnetic flux intensifying core 21 having opposite ends operating as the magnetic poles and a connecting portion 21a connecting the opposite ends of the core. The coil 20 as the magnetic field generating device 2 is wound around the connecting portion 21a of the core 21. The coil 20 and the connecting portion 21a of the core 21 are disposed outside the cylindrical wall of the casing 6.

Because the coil 20 as the magnetic field generating device 2 is disposed outside the casing 6, it is not necessary to provide an electric current collecting device, and therefore the power supply mechanism can be simple and the apparatus is reliable. Because the coil 20 is not disposed along the casing 6, it is easy to form the air inlet 8 and the air outlets 9 and 10 in the casing 6. Further, because the coil 20 is separated from the casing 6, the coil 20 can be wound the connecting portion 21a of the core 21 without being restricted by the size and the shape of the casing 6. As a result, work for winding the coil 20 is easy and the manufacturing cost is decreased.

Furthermore, the number of windings of the coil is almost not restricted by the casing unlike a case where a coil is disposed within the casing, the intensity of the magnetic flux can be easily increased by increasing the windings of the coil. Further, it is also possible to increase the intensity of the magnetic flux by making a diameter of the ends (poles) of the core 21 small, for example, by coning the ends of the core 21.

In any of the embodiments of the present invention, by cooling the air supplied to the apparatus, the magnetic susceptibility of oxygen which is a paramagnetic material is raised, so that the yield of oxygen can be further increased.

According to the present invention, the following technical advantages are obtained:

First, because the generated magnetic field has a magnetic flux extending in the axial direction of the space defined between the rotor and the casing, a size of the oxygen enriched air producing apparatus can be compact in a radial direction of the space. Further, because the oxygen enriched air outlet and the nitrogen enriched air outlet are spaced from each other in the axial direction of the space, the oxygen enriched air can be selectively removed through the oxygen enriched air outlet, so that the yield of oxygen can be increased.

Second, by disposing the magnetic field generating device at the casing, even in a case where the magnetic field generating device includes an electromagnet, it is unnecessary to provide an electric current collecting device, and therefore the apparatus is simple and reliable in operation.

Third, by disposing the magnetic field generating device at the rotor, the casing is not occupied by the magnetic field generating device, so that the freedom for arranging an air inlet and air outlet in the casing is increased.

Fourth, by constructing the oxygen enriching apparatus to be operable as a supercharger and by installing the apparatus to an air intake system of an internal combustion engine, a torque characteristic of the engine will be greatly improved.

Fifth, by constructing the apparatus such that a volume of the space close to the oxygen enriched air outlet is smaller than a volume of the space close to the nitrogen enriched air outlet, the portion close to the oxygen enriched air outlet can be occupied by the oxygen enriched air, so that a yield of oxygen can be increased.

Sixth, by disposing the magnetic field generating device outside the casing, an intensity of the generated magnetic flux can be controlled by selecting the winding number of the coil and the shape of the opposite ends of the magnetic flux intensifying core. Further, because the casing is not occupied by the magnetic flux generating device, the freedom for arranging the air inlet and the air outlets in the casing is increased.

Although the present invention has been described with reference to specific exemplary embodiments, it will be appreciated by those skilled in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A magnetic field oxygen enriched air producing apparatus comprising:

a casing;

a rotor disposed in and rotatably supported by said casing, said rotor and said casing defining a space there between, said space having an axis and extending in an axial direction;

a magnetic field generating device for generating a magnetic field in said space, said magnetic field including a magnetic flux extending axially within said space and magnetic poles produced at opposite ends of said space;

an air inlet formed in said casing;

an oxygen enriched air outlet formed in said casing at a position close to at least one of said magnetic poles; and a nitrogen enriched air outlet formed in said casing at a position axially spaced from said oxygen enriched air outlet.

2. An apparatus according to claim 1, wherein said magnetic field generating device includes an electromagnet including a coil.

3. An apparatus according to claim 1, wherein said magnetic field generating device includes a permanent magnet.

4. An apparatus according to claim 1, wherein said magnetic field generating device is disposed at said casing and fixed in relation therewith.

5. An apparatus according to claim 1, wherein said magnetic field generating device is disposed at said rotor so as to rotate therewith.

6. An apparatus according to claim 1, wherein said rotor includes a plurality of rotor elements, said apparatus being constructed and arranged to be operable as a supercharger selected from the group consisting of a Root's blower supercharger, a Lysholm compressor, a screw pump, and a movable vane compressor.

7. An apparatus according to claim 6, wherein each of said rotor elements includes an axially extending permanent magnet embedded therein.

8. An apparatus according to claim 6, wherein each of said rotor elements includes an axially extending hole formed therein having a surface, said magnetic field generating device which includes a coil disposed along said surface of said hole.

9. An apparatus according to claim 1, wherein said space includes a first volume generally adjacent to said oxygen enriched air outlet and a second volume greater than said first volume generally adjacent to said nitrogen enriched air outlet.

10. An apparatus according to claim 9, wherein said first volume has a radial distance between said rotor and said casing smaller than a radial distance between said rotor and said casing of said second volume.

11. An apparatus according to claim 1, wherein said magnetic field generating device includes:

a magnetic flux intensifying core having opposite ends operating as said magnetic poles and a connecting portion connecting said opposite ends of said core; and a coil wound around said connecting portion of said core, said coil and said connecting portion of said core being disposed outside of said casing.

12. An apparatus according to claim 11, wherein said magnetic flux intensifying core has opposite portions decreased in diameter toward respective ends.

* * * * *